M. BRENNER.
Slaughtering Windlasses.

No. 134,352.  Patented Dec. 31, 1872.

Witnesses  
R. T. Campbell  
J. N. Campbell

Inventor  
Moses Brenner  
by his atty  
Mason Fenwick & Lawrence

M. BRENNER.
Slaughtering Windlasses.
No. 134,352.  Patented Dec. 31, 1872.
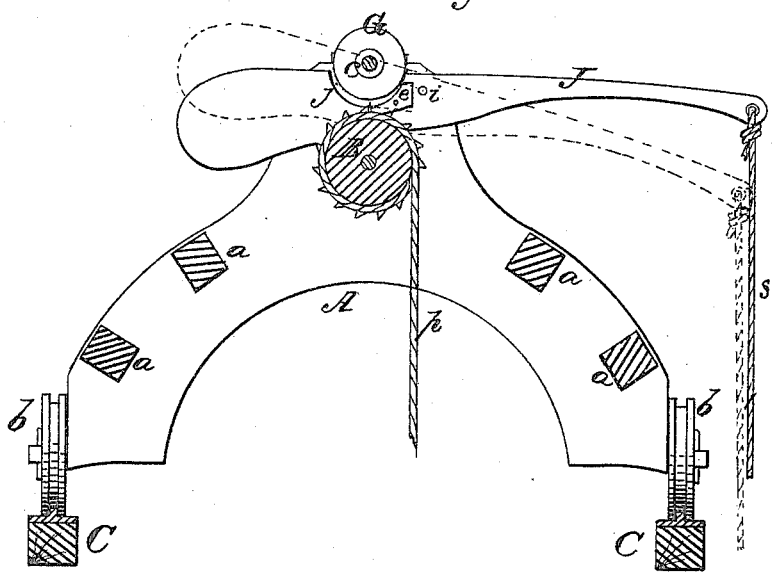
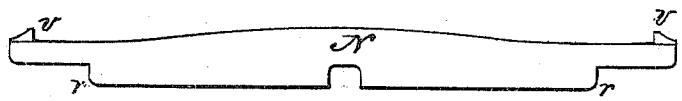
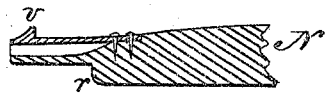
Witnesses  Inventor
R. T. Campbell  Moses Brenner
J. N. Campbell  by his attys
  Mason Fenwick Lawrence

UNITED STATES PATENT OFFICE.

MOSES BRENNER, OF BALTIMORE, MARYLAND.

IMPROVEMENT IN SLAUGHTERING-WINDLASSES.

Specification forming part of Letters Patent No. 134,352, dated December 31, 1872.

*To all whom it may concern:*

Be it known that I, MOSES BRENNER, of the city and county of Baltimore and State of Maryland, have invented certain new and useful Improvements to be used in Slaughtering Animals; and I do hereby declare that the following is a full, clear, and exact description thereof, reference being had to the accompanying drawing making part of this specification, in which—

Figure 1:
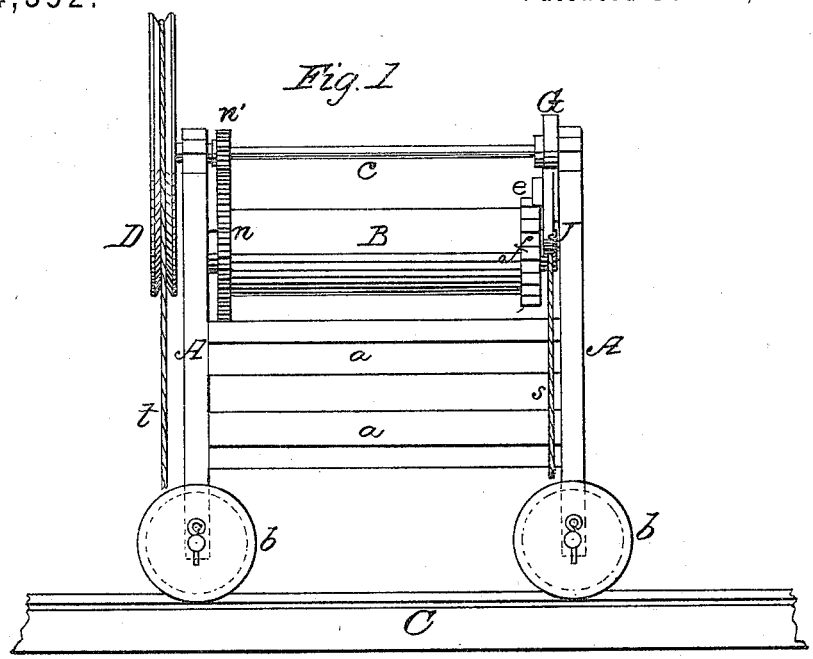
Figure 2:
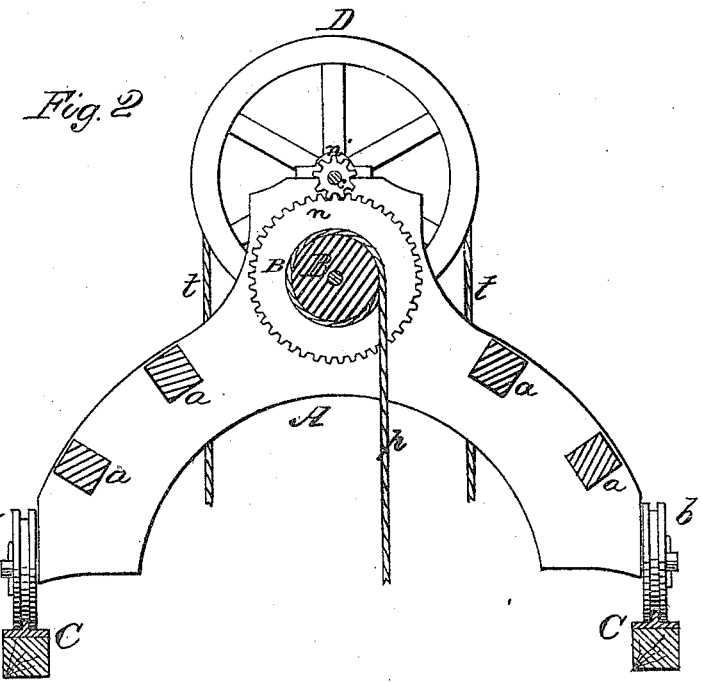

Figure 1 shows the hoisting apparatus mounted on its track; Fig. 2 is a section taken vertically through the apparatus, looking toward one side thereof; Fig. 3 is a section looking toward the opposite side of the apparatus; and Figs. 4 and 5 show the beef tree or gambrel.

Similar letters of reference indicate corresponding parts in the several figures.

This invention relates to certain novel improvements which are designed for facilitating the work of butchering animals, as will be hereinafter explained.

The following description of my invention will enable others skilled in the art to understand it.

In the accompanying drawing, A represents two standards, which are connected together by horizontal bars $a$, and mounted on grooved wheels $b\ b$, thus constituting a truck or carriage. C C represent rails, which are arranged at a suitable height in a slaughter-house, and which may extend from one end to the other thereof, and, if desirable, these rails may extend outside of the house when it is intended to load the meat into wagons by means of the hoisting apparatus. Horizontally across the top of the carriage is a shaft, $c$, which is supported by suitable journal-boxes, and which has keyed on it a large grooved pulley, D, a pinion spur-wheel, $n'$, and a brake-wheel, G. The grooved pulley D receives around it an endless rope, $t$, which extends down within convenient reach of a person standing on the floor of the slaughter-house. The pinion $n'$ engages with the teeth of a large spur-wheel, $n$, which is on one end of a drum, B, and gives a slow motion to this drum when the shaft $c$ is turned. The brake-wheel G is arranged directly over the concave portion $j$ of a brake-lever, J, which lever is pivoted to one of the standards of the carriage at $i$, and constructed with a pawl-tooth, $e$, on one side, as shown in Fig. 3. The lever J has one of its arms loaded, so that, by the preponderance of this end, the pawl-tooth will be kept in gear with ratchet-teeth $f$, on the drum B. That end of the lever J which is not loaded has a rope attached to it, by pulling which the pawl-tooth $e$ will be disengaged from the ratchet-teeth $f$, and the concave surface $j$ will be brought against the brake-wheel G on shaft $c$.

In connection with this apparatus, I employ a gambrel, which is represented by Figs. 4 and 5. The peculiarity of this tree N consists in its having spring-shoulders, $v\ v$, applied to its extremities, which, with the shoulders $r\ r$, will keep the legs of an animal in proper position on the tree. The shoulders or catches $v$ are formed on the ends of springs, which are secured into recesses in the tree, and these shoulders are beveled outward so as to allow the ends of the tree to be readily passed through the slits made between the tendons and bone of the animal's legs. These shoulders prevent the casual detachment of the legs from the tree, and are very useful.

For the purpose of drawing an animal from the pen into the slaughter-house and down to the ring, the carriage is moved over the ring, and a rope, $p$, which is wound upon the drum B, is drawn through the ring on the floor, and its end attached to the animal. Then, by winding rope $p$ on the drum, the pawl-tooth $e$ being engaged with its ratchet $f$, the animal can be drawn down to the ring with very little expenditure of labor.

After the animal is killed and opened, the gambrel N is applied to its legs, and to this gambrel the rope $p$ is fastened. Then, by means of the endless rope $t$, the drum B is turned, and the animal raised gradually as the skinning progresses.

After the animal is skinned and cleaned, it can be moved off to a convenient place and suspended from the rails C, ready for the market; or, if desired, the animal may be lowered into an ice-house by drawing on the rope $s$.

It will be seen by reference to the drawing that the drum B, on which the hoisting-rope $p$ is wound, is arranged parallel to the rails C C, on which the carriage is supported. This arrangement I find to be very important to prevent any liability of tilting the carriage by the weight which is being raised. If the drum B were arranged at right angles to the rails C, the position of the rope with relation to one or the other rails would be constantly changing; but by having the drum arranged as described the rope $p$ will not change its position with reference to the rails C C, being wound upon or unwound from the drum B. The rope will always be nearly in the middle of the space between the two rails in winding it up or unwinding it.

It will also be seen that the same lever which is used as the brake also answers the purpose of a pawl-lever for preventing a too rapid descent of a weight attached to the rope $p$.

Having described my invention, what I claim as new, and desire to secure by Letters Patent, is—

1. The windlass-roller B applied to the carriage A $a$ transversely to the axis of the roller of such carriage, but parallel to the rails on which the carriage is supported, substantially as and for the purpose described.

2. The gambrel or beef-tree N, constructed with spring shoulders $v$ substantially as described.

3. The gravitating-lever, J, constructed with a fixed pawl, $e$, and a concave edge $j$, and arranged between a ratchet-wheel, $f$, below, and a brake-wheel, G, above, so as to operate as a brake for the drum B when its pawl is not engaged with the said ratchet-wheel, substantially as described.

M. BRENNER.

Witnesses:
N. I. SCHAEFER,
JOHN K. STEIN.